United States Patent
Miao et al.

(10) Patent No.: US 11,109,357 B2
(45) Date of Patent: Aug. 31, 2021

(54) SEMI-PERSISTENT SCHEDULING METHOD, NETWORK DEVICE, AND TERMINAL DEVICE

(71) Applicant: Huawei Technologies Co., Ltd., Guangdong (CN)

(72) Inventors: Jinhua Miao, Shenzhen (CN); Wei Quan, Beijing (CN); Bin Xu, Beijing (CN); Li Chai, Shenzhen (CN); Jian Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 73 days.

(21) Appl. No.: 16/530,398

(22) Filed: Aug. 2, 2019

(65) Prior Publication Data

US 2019/0357180 A1 Nov. 21, 2019

Related U.S. Application Data

(63) Continuation of application No. PCT/CN2018/075126, filed on Feb. 2, 2018.

(30) Foreign Application Priority Data

Feb. 4, 2017 (CN) .......................... 201710063990.7

(51) Int. Cl.
*H04W 72/04* (2009.01)

(52) U.S. Cl.
CPC ..................... *H04W 72/04* (2013.01)

(58) Field of Classification Search
CPC .. H04W 72/04; H04W 72/12; H04W 72/1205
See application file for complete search history.

(56) References Cited

U.S. PATENT DOCUMENTS 10,728,922 B2 * 7/2020 Bagheri .............. H04W 72/042
2013/0301582 A1 11/2013 Jiang et al.
(Continued)

FOREIGN PATENT DOCUMENTS

CN 102378383 A 3/2012
CN 102595600 A 7/2012
(Continued)

OTHER PUBLICATIONS

Xiaomi Communications, Discussions on DCI design consideration for shortened TTI SPS operation. 3GPP TSG RAN WG1 meeting #86, Gothenburg, Sweden, Aug. 22-26, 2016, R1-167334, 3 pages.
(Continued)

*Primary Examiner* — Min Jung
(74) *Attorney, Agent, or Firm* — Womble Bond Dickinson (US) LLP

(57) ABSTRACT

A semi-persistent scheduling method includes: determining a semi-persistent scheduling (SPS) configuration parameter, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; determining resource locations of time-frequency resources available for sending or receiving the SPS data based on the SPS period length, the symbol information, and the SPS activation command; and sending, by the network device, the SPS configuration parameter to a terminal device. Resource utilization of semi-persistent scheduling can be improved, and a transmission delay of the SPS data can be reduced.

16 Claims, 5 Drawing Sheets

(56) References Cited

U.S. PATENT DOCUMENTS

| | | | |
|---|---|---|---|
| 2014/0198699 A1 | 7/2014 | Makharia et al. | |
| 2014/0269475 A1* | 9/2014 | Ehsan et al. | |
| 2019/0166616 A1* | 5/2019 | Liu | H04W 72/04 |
| 2019/0182644 A1* | 6/2019 | Zheng | H04W 72/1205 |
| 2019/0230654 A1* | 7/2019 | Luo | H04W 72/0446 |
| 2019/0289624 A1* | 9/2019 | Dudda | H04W 72/1289 |

FOREIGN PATENT DOCUMENTS

| | | |
|---|---|---|
| CN | 102907137 A | 1/2013 |
| CN | 102917455 A | 2/2013 |
| CN | 104919879 A | 9/2015 |
| WO | 2012155589 A1 | 11/2012 |
| WO | 2013046468 A1 | 4/2013 |

OTHER PUBLICATIONS

R2-115786 CATT,"Discussion on SPS",3GPP TSG RAN WG2 Meeting #76,San Francisco, USA, Nov. 14-18, 2011,total 3 pages.
3GPP TS 36.321 V14.1.0 (Dec. 2016),3rd Generation Partnership Project;Technical Specification Group Radio Access Network;Evolved Universal Terrestrial Radio Access (E-UTRA);Medium Access Control (MAC) protocol specification (Release 14),total 98 pages.
3GPP TS 36.331 V14.1.0 (Dec. 2016),3rd Generation Partnership Project;Technical Specification Group Radio Access Network;Evolved Universal Terrestrial Radio Access (E-UTRA);Radio Resource Control (RRC);Protocol specification (Release 14),dated Dec. 2016,total 654 pages.

\* cited by examiner

SEMI-PERSISTENT SCHEDULING METHOD, NETWORK DEVICE, AND TERMINAL DEVICE

CROSS-REFERENCE TO RELATED APPLICATIONS

This application is a continuation of International Application No. PCT/CN2018/075126, filed on Feb. 2, 2018, which claims priority to Chinese Patent Application No. 201710063990.7, filed on Feb. 4, 2017, The disclosures of the aforementioned applications are incorporated herein by reference in their entireties.

TECHNICAL FIELD

This application relates to the field of communications technologies, and in particular, to a semi-persistent scheduling method, a network device, and a terminal device.

BACKGROUND

In a long term evolution (LTE) system, dynamic scheduling is highly flexible, and can improve radio band utilization, ensure quality of service (QoS) for a user, and increase a system capacity. Therefore, the dynamic scheduling is a most basic scheduling manner in the LTE system. In the dynamic scheduling, resources are allocated as required, and scheduling signaling needs to be exchanged during each scheduling. For a service whose burst feature is not obvious and real-time performance is very high, a network device needs to schedule a terminal device in each transmission time interval (TTI), and scheduling information is transmitted on a physical downlink control channel (PDCCH). Consequently, the terminal device that can be scheduled in each TTI is limited by a resource of the PDCCH.

Therefore, for the service whose burst feature is not obvious and real-time performance is very high, semi-persistent scheduling (SPS) is considered to be used. Specifically, the network device assigns, to the terminal device in a TTI, a time-frequency resource (which is referred to as an SPS resource herein) used for the service. Subsequently, the terminal device receives or sends data by using the SPS resource after each specified period. The resource only needs to be allocated once during the SPS. Therefore, an SPS mode can reduce resource overheads of the PDCCH.

In a related technology, in a process of performing scheduling in an SPS manner, an SPS resource scheduled in each period corresponds to one subframe, and the subframe can be used to only transmit SPS data. However, in an actual application, when the SPS data is transmitted in a form of a subframe, there is usually an unused resource in the subframe, causing low resource utilization during the SPS in the related technology. In addition, because the SPS data is transmitted in form of a subframe in the related technology, a transmission delay of the SPS data is fixed to 1 ms, causing a relatively high transmission delay of the SPS data.

SUMMARY

Embodiments of this application provide a semi-persistent scheduling method, a network device, and a terminal device, to improve resource utilization during semi-persistent scheduling and reduce a transmission delay of SPS data.

According to a first aspect, a semi-persistent scheduling method is provided. The method includes: determining, by a network device, a semi-persistent scheduling SPS configuration parameter, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; determining, by the network device based on the SPS period length, the symbol information, and the SPS activation command, resource locations of time-frequency resources available for sending or receiving the SPS data; and sending, by the network device, the SPS configuration parameter to a terminal device.

In one embodiment, the network device determines the semi-persistent scheduling SPS configuration parameter, where the SPS configuration parameter includes the SPS period length, the symbol information, and the SPS activation command, where the SPS activation command is used to indicate the system frame number and the subframe number of the first time-frequency resource, and the symbol information is used to indicate the location of the symbol that is in the subframe and that is occupied by the first time-frequency resource; and then the network device determines, based on the SPS period length, the symbol information, and the SPS activation command, the resource locations of the time-frequency resources available for sending or receiving the SPS data, and sends the SPS configuration parameter to the terminal device. In this embodiment, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In addition, in this embodiment of this application, when the SPS data is transmitted between the network device and the terminal device, the used time-frequency resource is on a symbol level. Therefore, in the technical solution in this embodiment, a transmission delay of the SPS data is less than 1 ms, so that the transmission delay of the SPS data can be reduced.

In one embodiment, the determining, by the network device based on the SPS period length, the symbol information, and the SPS activation command, resource locations of time-frequency resources available for sending or receiving the SPS data includes: determining, by the network device based on the symbol information and the SPS activation command, a resource location of the first time-frequency resource; and determining, by the network device based on the SPS period length and the resource location of the first time-frequency resource, a resource location of a subsequent time-frequency resource available for sending or receiving the SPS data.

In this embodiment, the network device may determine, based on the indication of the SPS activation command, the system frame number and the subframe number of the first time-frequency resource. Then, the network device may determine, based on the indication of the symbol information, the location of the symbol that is in the subframe corresponding to the subframe number and that is occupied by the first time-frequency resource (namely, the resource location of the first time-frequency resource). Based on this, the network device uses, as the resource location of the subsequent time-frequency resource available for sending or receiving the SPS data, a resource location determined by each addition of one SPS period to the resource location of the first time-frequency resource.

In one embodiment, the symbol information includes a start symbol location and a quantity of symbols, or includes short-subframe quantity information and a short-subframe number, where the short-subframe quantity information is used to indicate a quantity of short subframes in each subframe.

In this embodiment, when the symbol information includes the start symbol location and the quantity of symbols, the network device may determine, based on the start symbol location, the first symbol occupied by the time-frequency resource available for sending or receiving the SPS data. Based on this, the network device may determine, based on the quantity of symbols, all symbols occupied by the time-frequency resource available for sending or receiving the SPS data, where the quantity of symbols may be 1 or larger than 1. When the symbol information includes the short-subframe quantity information and the short-subframe number, the network device may determine, based on the short-subframe quantity information, a quantity of short subframes in each subframe that are occupied by the time-frequency resource available for sending or receiving the SPS data, and may determine, based on the short-subframe number, a short subframe occupied by the time-frequency resource available for sending or receiving the SPS data, where the quantity of short subframes in each subframe is at least 2, and the short subframes in each subframe may have a same length or different lengths.

In one embodiment, the method further includes: sending or receiving, by the network device, the SPS data on the time-frequency resource available for sending or receiving the SPS data.

In one embodiment, the SPS configuration parameter further includes a first offset, and the method further includes: when the time-frequency resource available for sending or receiving the SPS data is partially or completely occupied, calculating, by the network device, an offset time-frequency resource based on the first offset, and receiving or sending the SPS data on the offset time-frequency resource.

In this embodiment, the SPS configuration parameter may further include the first offset. When a PDCCH is configured on the time-frequency resource available for sending or receiving the SPS data; or other data is being transmitted on the time-frequency resource available for sending or receiving the SPS data; or there are a plurality of SPSs between the network device and the terminal device, and the time-frequency resource that is available for sending or receiving the SPS data and that is determined during the SPS in this embodiment of this application partially or completely overlaps that determined during one or more other SPSs, the time-frequency resource available for sending or receiving the SPS data is partially or completely occupied. In this case, mutual interference exists when the network device sends or receives the SPS data on the time-frequency resource available for sending or receiving the SPS data. Therefore, the network device adds the first offset to the resource location of the time-frequency resource available for sending or receiving the SPS data, to calculate the offset time-frequency resource, and then the network device receives or sends the SPS data on the offset time-frequency resource, thereby ensuring normal transmission of the SPS data between the network device and the terminal device.

In one embodiment, the method further includes: when the time-frequency resource available for sending or receiving the SPS data is partially occupied, sending or receiving, by the network device, the SPS data on an unoccupied time-frequency resource available for sending or receiving the SPS data.

In this embodiment, when the time-frequency resource available for sending or receiving the SPS data is partially occupied, the network device may send or receive the time-frequency resource on the unoccupied time-frequency resource available for sending or receiving the SPS data, so that the unoccupied part of the time-frequency resource available for sending or receiving the SPS data is used, thereby improving the resource utilization.

In one embodiment, the SPS configuration parameter further includes SPS priority information. The method further includes: when the time-frequency resource available for sending or receiving the SPS data partially or completely overlaps another SPS time-frequency resource, determining, by the network device based on the SPS priority information, a behavior of sending or receiving the SPS data.

In this embodiment, the SPS configuration parameter may further include the SPS priority information, where the SPS priority information is used to indicate a priority of the SPS data. In this case, when there are a plurality of SPSs between the network device and the terminal device, if time-frequency resources that are available for sending or receiving SPS data and that are determined during the plurality of SPSs partially or completely overlap, the network device may determine a priority of SPS data based on the SPS priority information in the SPS configuration parameter. Then, the network device may determine, based on a priority of each piece of SPS data, a behavior of sending or receiving the piece of SPS data. Specifically, for SPS data having a highest priority, the network device uses a time-frequency resource available for sending or receiving the SPS data to send or receive the SPS data. For SPS data whose priority is not the highest, the network device may not send or receive the SPS data; or may add one or more second offsets to a resource location of a time-frequency resource available for sending or receiving the SPS data, where a lower priority of the SPS data indicates more added second offsets. Then, the network device sends or receives the SPS data on an offset time-frequency resource.

In one embodiment, the SPS configuration parameter further includes carrier information, beam information, cell information, cell group information, or logical channel information. The method further includes: determining, by the network device based on the carrier information, the beam information, the cell information, the cell group information, or the logical channel information, a carrier, a beam, a cell, a cell group, or a logical channel used for sending or receiving the SPS data.

In this embodiment, the SPS configuration parameter includes the carrier information, the beam information, the cell information, the cell group information, or the logical channel information. Therefore, the network device may determine, based on the carrier information, the beam information, the cell information, the cell group information, or the logical channel information, the carrier, the beam, the cell, the cell group, or the logical channel used for sending or receiving the SPS data, to determine an area range in which the semi-persistent scheduling is used.

In one embodiment, the SPS configuration parameter further includes a quantity of hybrid automatic repeat requests (HARQs). The method further includes: determining, by the network device, a HARQ ID based on the quantity of HARQs and the resource location of the time-frequency resource available for sending the SPS data.

In this embodiment, the SPS configuration parameter further includes the quantity of HARQs, so that when downlink transmission of the SPS data is performed between the network device and the terminal device, the network device may determine the HARQ ID based on the quantity of HARQs and the resource location of the time-frequency resource available for sending the SPS data.

In one embodiment, the SPS configuration parameter further includes an SPS radio network temporary identifier.

In this embodiment, the network device may distinguish different service information based on the SPS radio network temporary identifier.

According to a second aspect, a semi-persistent scheduling method is provided. The method includes: receiving, by a terminal device, a semi-persistent scheduling SPS configuration parameter sent by a network device, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; and determining, by the terminal device based on the SPS period length, the symbol information, and the SPS activation command, resource locations of time-frequency resources available for sending or receiving the SPS data.

In one embodiment, the terminal device receives the semi-persistent scheduling SPS configuration parameter sent by the network device, where the SPS configuration parameter includes the SPS period length, the symbol information, where the SPS activation command, the SPS activation command is used to indicate the system frame number and the subframe number of the first time-frequency resource, and the symbol information is used to indicate the location of the symbol that is in the subframe and that is occupied by the first time-frequency resource; and then the terminal device determines, based on the SPS period length, the symbol information, and the SPS activation command, the resource locations of the time-frequency resources available for sending or receiving the SPS data. In this embodiment of this application, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In addition, in this embodiment, when the SPS data is transmitted between the network device and the terminal device, the used time-frequency resource is on a symbol level. Therefore, in the technical solution in this embodiment, a transmission delay of the SPS data is less than 1 ms, so that the transmission delay of the SPS data can be reduced.

In one embodiment, the determining, by the terminal device based on the SPS period length, the symbol information, and the SPS activation command, resource locations of time-frequency resources available for sending or receiving the SPS data includes: determining, by the terminal device based on the symbol information and the SPS activation command, a resource location of the first time-frequency resource; and determining, by the terminal device based on the SPS period length and the resource location of the first time-frequency resource, a resource location of a subsequent time-frequency resource available for sending or receiving the SPS data.

In this embodiment, the terminal device may determine, based on the indication of the SPS activation command, the system frame number and the subframe number of the first time-frequency resource. Then, the terminal device may determine, based on the indication of the symbol information, the location of the symbol that is the subframe corresponding to the subframe number and that is occupied by the first time-frequency resource (namely, the resource location of the first time-frequency resource). Based on this, the terminal device uses, as the resource location of the subsequent time-frequency resource available for sending or receiving the SPS data, a resource location determined by each addition of one SPS period to the resource location of the first time-frequency resource.

In one embodiment, the symbol information includes a start symbol location and a quantity of symbols, or includes short-subframe quantity information and a short-subframe number, where the short-subframe quantity information is used to indicate a quantity of short subframes in each subframe.

In this embodiment, when the symbol information includes the start symbol location and the quantity of symbols, the terminal device may determine, based on the start symbol location, the first symbol occupied by the time-frequency resource available for sending or receiving the SPS data. Based on this, the terminal device may determine, based on the quantity of symbols, all symbols occupied by the time-frequency resource available for sending or receiving the SPS data, where the quantity of symbols may be 1 or larger than 1. When the symbol information includes the short-subframe quantity information and the short-subframe number, the terminal device may determine, based on the short-subframe quantity information, a quantity of short subframes in each subframe that are occupied by the time-frequency resource available for sending or receiving the SPS data, and may determine, based on the short-subframe number, a short subframe occupied by the time-frequency resource available for sending or receiving the SPS data, where the quantity of short subframes in each subframe is at least 2, and the short subframes in each subframe may have a same length or different lengths.

In one embodiment, the method further includes: sending or receiving, by the terminal device, the SPS data on the time-frequency resource available for sending or receiving the SPS data.

In one embodiment, the SPS configuration parameter further includes a first offset, and the method further includes: when the time-frequency resource available for sending or receiving the SPS data is partially or completely occupied, calculating, by the terminal device, an offset time-frequency resource based on the first offset, and receiving or sending the SPS data on the offset time-frequency resource.

In this embodiment, the SPS configuration parameter may further include the first offset. When a PDCCH is configured on the time-frequency resource available for sending or receiving the SPS data; or other data is being transmitted on the time-frequency resource available for sending or receiving the SPS data; or there are a plurality of SPSs between the network device and the terminal device, and the time-frequency resource that is available for sending or receiving the SPS data and that is determined during the SPS in this embodiment partially or completely overlaps that determined during one or more other SPSs, the time-frequency resource available for sending or receiving the SPS data is partially or completely occupied. In this case, mutual interference exists when the terminal device sends or receives the SPS data on the time-frequency resource available for sending or receiving the SPS data. Therefore, the terminal device adds the first offset to the resource location of the time-frequency resource available for sending or receiving the SPS data, to calculate the offset time-frequency resource, and then the terminal device receives or sends the SPS data on the offset time-frequency resource, thereby ensuring normal transmission of the SPS data between the network device and the terminal device.

In one embodiment, the method further includes: when the time-frequency resource available for sending or receiving the SPS data is partially occupied, sending or receiving, by the terminal device, the SPS data on an unoccupied time-frequency resource available for sending or receiving the SPS data.

In this embodiment, when the time-frequency resource available for sending or receiving the SPS data is partially occupied, the terminal device may send or receive the time-frequency resource on the unoccupied time-frequency resource available for sending or receiving the SPS data, so that the unoccupied part of the time-frequency resource available for sending or receiving the SPS data is used, thereby improving the resource utilization.

In one embodiment, the SPS configuration parameter further includes SPS priority information. The method further includes: when the time-frequency resource available for sending or receiving the SPS data partially or completely overlaps another SPS time-frequency resource, determining, by the terminal device based on the SPS priority information, a behavior of sending or receiving the SPS data.

In this embodiment, the SPS configuration parameter may further include the SPS priority information, where the SPS priority information is used to indicate a priority of the SPS data. In this case, when there are a plurality of SPSs between the network device and the terminal device, if time-frequency resources that are available for sending or receiving SPS data and that are determined during the plurality of SPSs partially or completely overlap, the terminal device may determine a priority of the SPS data based on the SPS priority information in the SPS configuration parameter. Then, the terminal device may determine, based on a priority of each piece of SPS data, a behavior of sending or receiving the piece of SPS data. In one embodiment, for SPS data having a highest priority, the network device uses a time-frequency resource available for sending or receiving the SPS data to send or receive the SPS data. For SPS data whose priority is not the highest, the terminal device may not send or receive the SPS data; or may add one or more second offsets to a resource location of a time-frequency resource available for sending or receiving the SPS data, where a lower priority of the SPS data indicates more added second offsets. Then, the terminal device sends or receives the SPS data on an offset time-frequency resource.

In one embodiment, the SPS configuration parameter further includes carrier information, beam information, cell information, cell group information, or logical channel information. The method further includes: determining, by the terminal device based on the carrier information, the beam information, the cell information, the cell group information, or the logical channel information, a carrier, a beam, a cell, or a cell group, or a logical channel used for sending or receiving the SPS data.

In this embodiment, the SPS configuration parameter includes the carrier information, the beam information, the cell information, the cell group information, or the logical channel information. Therefore, the terminal device may determine, based on the carrier information, the beam information, the cell information, the cell group information, or the logical channel information, the carrier, the beam, the cell, the cell group, or the logical channel used for sending or receiving the SPS data, to determine an area range in which the semi-persistent scheduling is used.

In one embodiment, the SPS configuration parameter further includes a quantity of hybrid automatic repeat requests HARQs, and the method further includes:

determining, by the terminal device, a HARQ ID based on the quantity of HARQs and the resource location of the time-frequency resource available for sending the SPS data.

In this embodiment, the SPS configuration parameter further includes the quantity of HARQs, so that when downlink transmission of the SPS data is performed between the network device and the terminal device, the terminal device may determine the HARQ ID based on the quantity of HARQs and the resource location of the time-frequency resource available for sending the SPS data.

In one embodiment, the SPS configuration parameter further includes an SPS radio network temporary identifier.

In this embodiment, the network device may distinguish different service information based on the SPS radio network temporary identifier.

According to a third aspect, a network device is provided. The network device includes: a processing module, configured to: determine a semi-persistent scheduling SPS configuration parameter, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; and determine, based on the SPS period length, the symbol information, and the SPS activation command, resource locations of time-frequency resources available for sending or receiving the SPS data; and a transceiver module, configured to send the SPS configuration parameter to a terminal device.

In one embodiment, the processing module determines the semi-persistent scheduling SPS configuration parameter, where the SPS configuration parameter includes the SPS period length, the symbol information, and the SPS activation command, where the SPS activation command is used to indicate the system frame number and the subframe number of the first time-frequency resource, and the symbol information is used to indicate the location of the symbol that is in the subframe and that is occupied by the first time-frequency resource; then the processing module determines, based on the SPS period length, the symbol information, and the SPS activation command, the resource locations of the time-frequency resources available for sending or receiving the SPS data; at last, the transceiver module sends the SPS configuration parameter to the terminal device. In this embodiment, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In addition, in this embodiment, when the SPS data is transmitted between the network device and the terminal device, the used time-frequency resource is on a symbol level. Therefore, in the technical solution in this embodiment of this application, a transmission delay of the SPS data is less than 1 ms, so that the transmission delay of the SPS data can be reduced.

In one embodiment, the processing module is configured to: determine, based on the symbol information and the SPS activation command, a resource location of the first time-frequency resource; and determine, based on the SPS period length and the resource location of the first time-frequency resource, a resource location of a subsequent time-frequency resource available for sending or receiving the SPS data.

In one embodiment, the symbol information includes a start symbol location and a quantity of symbols, or includes short-subframe quantity information and a short-subframe number, where the short-subframe quantity information is used to indicate a quantity of short subframes in each subframe.

In one embodiment, the transceiver module is further configured to send or receive the SPS data on the time-frequency resource available for sending or receiving the SPS data.

In one embodiment, the SPS configuration parameter further includes a first offset; the processing module is further configured to: when the time-frequency resource available for sending or receiving the SPS data is partially or completely occupied, calculate an offset time-frequency resource based on the first offset; and the transceiver module is further configured to receive or send the SPS data on the offset time-frequency resource.

In one embodiment, the transceiver module is further configured to: when the time-frequency resource available for sending or receiving the SPS data is partially occupied, send or receive the SPS data on an unoccupied time-frequency resource available for sending or receiving the SPS data.

In one embodiment, the SPS configuration parameter further includes SPS priority information, and the processing module is further configured to: when the time-frequency resource available for sending or receiving the SPS data partially or completely overlaps another SPS time-frequency resource, determine, based on the SPS priority information, a behavior of sending or receiving the SPS data.

In one embodiment, the SPS configuration parameter further includes carrier information, beam information, cell information, cell group information, or logical channel information. The processing module is further configured to determine, based on the carrier information, the beam information, the cell information, the cell group information, or the logical channel information, a carrier, a beam, a cell, a cell group, or a logical channel for sending or receiving the SPS data.

In one embodiment, the SPS configuration parameter further includes a quantity of hybrid automatic repeat requests HARQs. The processing module is further configured to determine a HARQ ID based on the quantity of HARQs and the resource location of the time-frequency resource available for sending the SPS data.

In one embodiment, the SPS configuration parameter further includes an SPS radio network temporary identifier.

According to a fourth aspect, a terminal device is provided. The terminal device includes: a transceiver module, configured to receive a semi-persistent scheduling SPS configuration parameter sent by a network device, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; and a processing module, configured to determine, based on the SPS period length, the symbol information, and the SPS activation command, resource locations of time-frequency resources available for sending or receiving the SPS data.

In one embodiment, the transceiver module receives the semi-persistent scheduling SPS configuration parameter sent by the network device, where the SPS configuration parameter includes the SPS period length, the symbol information, and the SPS activation command, where the SPS activation command is used to indicate the system frame number and the subframe number of the first time-frequency resource, and the symbol information is used to indicate the location of the symbol that is in the subframe and that is occupied by the first time-frequency resource; and then the processing module determines, based on the SPS period length, the symbol information, and the SPS activation command, the resource locations of the time-frequency resources available for sending or receiving the SPS data. In this embodiment, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In addition, in this embodiment, when the SPS data is transmitted between the network device and the terminal device, the used time-frequency resource is on a symbol level. Therefore, in the technical solution in this embodiment, a transmission delay of the SPS data is less than 1 ms, so that the transmission delay of the SPS data can be reduced.

In one embodiment, the processing module is configured to: determine, based on the symbol information and the SPS activation command, a resource location of the first time-frequency resource; and determine, based on the SPS period length and the resource location of the first time-frequency resource, a resource location of a subsequent time-frequency resource available for sending or receiving the SPS data.

In one embodiment, the symbol information includes a start symbol location and a quantity of symbols, or includes short-subframe quantity information and a short-subframe number, where the short-subframe quantity information is used to indicate a quantity of short subframes in each subframe.

In one embodiment, the transceiver module is further configured to send or receive the SPS data on the time-frequency resource available for sending or receiving the SPS data.

In one embodiment, the SPS configuration parameter further includes a first offset; the processing module is further configured to: when the time-frequency resource available for sending or receiving the SPS data is partially or completely occupied, calculate an offset time-frequency resource based on the first offset; and the transceiver module is further configured to receive or send the SPS data on the offset time-frequency resource.

In one embodiment, the transceiver module is further configured to: when the time-frequency resource available for sending or receiving the SPS data is partially occupied, send or receive the SPS data on an unoccupied time-frequency resource available for sending or receiving the SPS data.

In one embodiment, the SPS configuration parameter further includes SPS priority information, and the processing module is further configured to: when the time-frequency resource available for sending or receiving the SPS data partially or completely overlaps another SPS time-frequency resource, determine, based on the SPS priority information, a behavior of sending or receiving the SPS data.

In one embodiment, the SPS configuration parameter further includes carrier information, beam information, cell information, cell group information, or logical channel information. The processing module is further configured to determine, based on the carrier information, the beam information, the cell information, the cell group information, or the logical channel information, a carrier, a beam, a cell, a cell group, or a logical channel for sending or receiving the SPS data.

In one embodiment, the SPS configuration parameter further includes a quantity of hybrid automatic repeat requests HARQs. The processing module is further configured to determine a HARQ ID based on the quantity of HARQs and the resource location of the time-frequency resource available for sending the SPS data.

In one embodiment, the SPS configuration parameter further includes an SPS radio network temporary identifier.

Embodiments of this application further provide a computer-readable storage medium, a computer program product, and a communications device. The computer-readable storage medium includes an instruction, and when the instruction runs on a computer, the computer is enabled to perform the method according to any one of the foregoing aspects or the implementations. When the computer program product runs on a computer, the computer is enabled to perform the method according to any one of the foregoing aspects or the implementations. The communications device includes a memory, a processor, and a computer program that is stored in the memory and that can run in the processor. When executing the program, the processor implements the method according to any one of the foregoing aspects or the implementations.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

Figure 1:
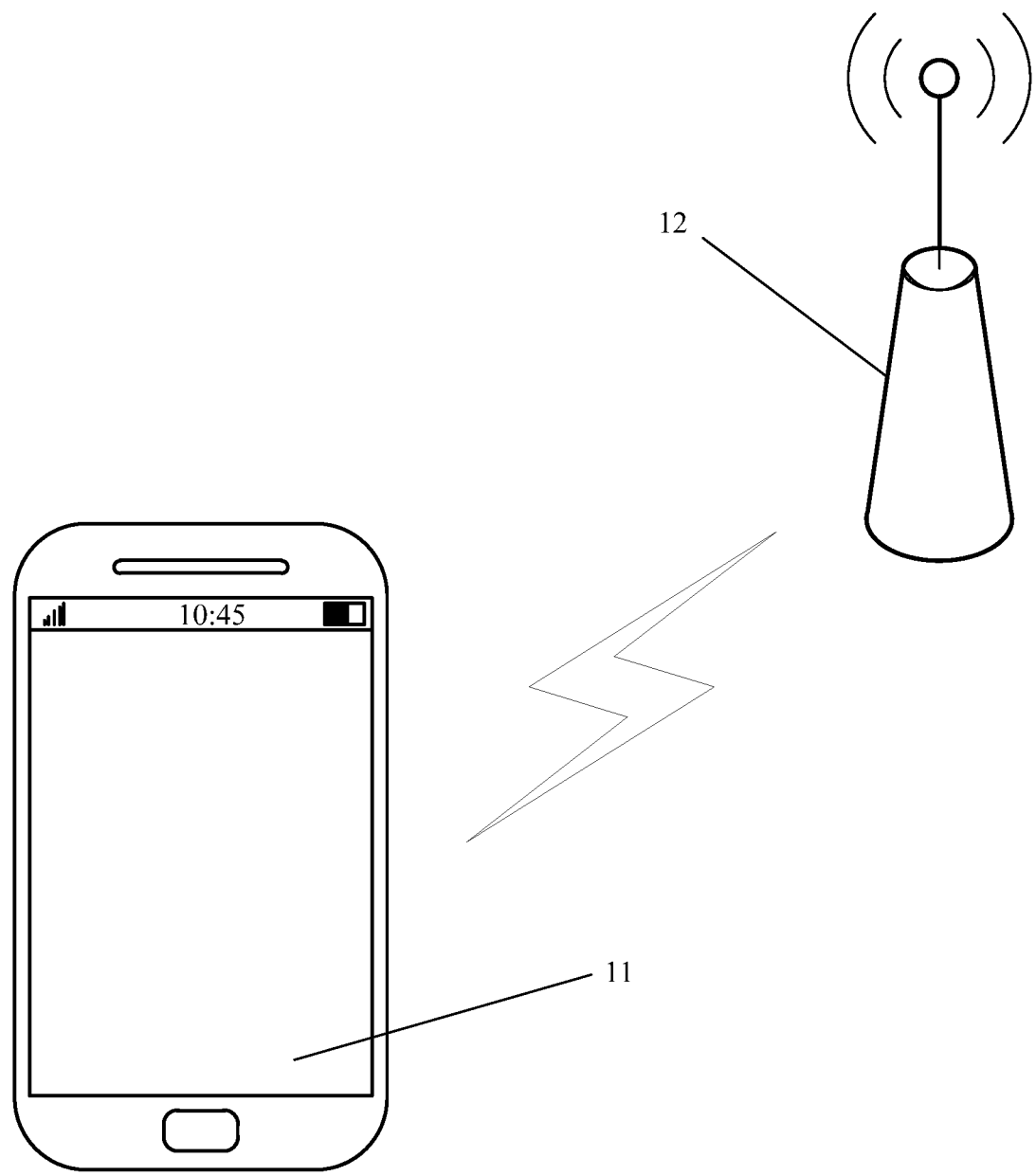
FIG. 1 is a schematic diagram of an application scenario according to one embodiment.

An application scenario of the embodiments of this application is described below with reference to the accompanying drawings. FIG. 1 is a schematic diagram of an application scenario according to an embodiment of this application. A terminal device 11 and a network device 12 are included in the application scenario, where the application scenario in this embodiment is applicable to a communications system such as a 4G, 4.5G, or 5G communications system.

In one embodiment, the terminal device 11 may be a device that provides a user with voice and/or data connectivity, a handheld device with a wireless connection function, or another processing device connected to a wireless modem. The terminal device 11 may communicate with one or more core networks through a radio access network (RAN). The terminal device 11 may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the terminal device 11 may be a device such as a personal communications service (PCS) phone, a cordless telephone set, a session initiation protocol (SIP) phone, a wireless local loop (WLL) station, or a personal digital assistant (PDA). The terminal device 11 may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device, or user equipment (UE). The network device 12 may be a base station, an enhanced base station, a relay having a scheduling function, a device having a base station function, or the like, where the base station may be an evolved NodeB (eNB) in an LTE system, or may be a base station in another system. This is not limited in this embodiment of this application.

In the application scenario shown in FIG. 1, embodiments of this application provide a semi-persistent scheduling method, a network device, and a terminal device, to resolve problems of low resource utilization and a relatively high transmission delay of SPS data when semi-persistent scheduling is used in a related technology.

In one embodiment, the network device 12 determines a semi-persistent scheduling SPS configuration parameter. The SPS configuration parameter includes an SPS period length, symbol information, and an SPS activation command, where the SPS activation command is used to indicate a system frame number and a subframe number of a first time-frequency resource available for sending or receiving SPS data. The symbol information is used to indicate a location of a symbol that is in a subframe and that is occupied by the first time-frequency resource. The SPS period length is used to indicate a time interval between two neighboring time-frequency resources available for sending or receiving the SPS data. After determining the SPS configuration parameter, the network device 12 may determine, based on the SPS period length, the symbol information, and the SPS activation command in the SPS configuration parameter, resource locations of time-frequency resources available for sending or receiving the SPS data. In addition, the network device 12 sends the determined SPS configuration parameter to the terminal device 11, so that the terminal device 11 determines, based on the SPS period length, the symbol information, and the SPS activation command in the SPS configuration parameter, the resource locations of the time-frequency resources available for sending or receiving the SPS data. Based on this, the SPS data is transmitted between the network device 12 and the terminal device 11 on the time-frequency resource available for sending or receiving the SPS data (for example, the network device 12 sends the SPS data to the terminal device 11, or the terminal device 11 sends the SPS data to the network device 12).

In this embodiment, the terminal device 11 and the network device 12 may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe (that is, the time-frequency available resource for sending or receiving the SPS data is on a symbol level), so that the network device 12 and the terminal device 11 can transmit other data on a remaining symbol resource in the same subframe, thereby improving resource utilization during semi-persistent scheduling. In addition, in this embodiment of this application, when the SPS data is transmitted between the network device 12 and the terminal device 11, the used time-frequency resource is on the symbol level. Therefore, in the technical solution in this embodiment, a transmission delay of the SPS data is less than 1 ms, so that the transmission delay of the SPS data can be reduced. It should be noted herein that, the symbol in this specification is an orthogonal frequency division multiplexing (OFDM) symbol.

An interaction process between the terminal device 11 and the network device 12 is described in detail below by using an embodiment shown in FIG. 2.

Figure 2:
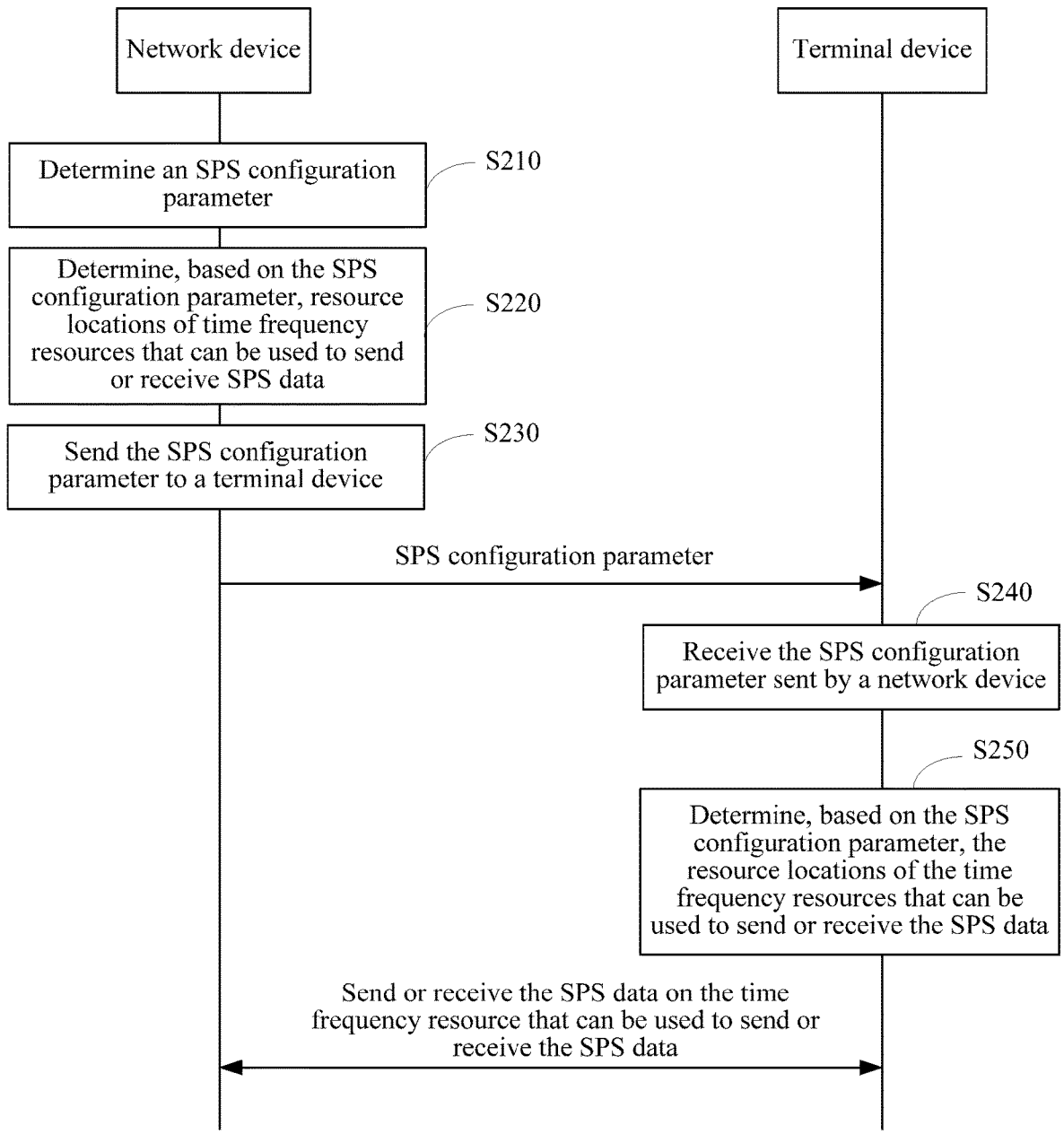
FIG. 2 is a flowchart of a semi-persistent scheduling method according to one embodiment.

FIG. 2 is a flowchart of a semi-persistent scheduling method according to one embodiment. This embodiment may include the following steps.

Step S210. The network device 12 determines an SPS configuration parameter.

In one embodiment, the network device may predefine the SPS configuration parameter. When SPS needs to be performed, the predefined SPS configuration parameter is invoked. Alternatively, the network device may instantly set the SPS configuration parameter when SPS needs to be performed.

The SPS configuration parameter may include an SPS period length, symbol information, and an SPS activation command. Herein, the SPS activation command is used to indicate a system frame number and a subframe number of a first time-frequency resource available for sending or receiving SPS data, the symbol information is used to indicate a location of a symbol that is in a subframe and that is occupied by the first time-frequency resource, and the SPS period length is used to indicate a time interval between two neighboring time-frequency resources used to send or receive the SPS data.

In one embodiment, the symbol information may have a plurality of forms of expression. For example, the symbol information may include a start symbol location and a quantity of symbols (for example, a start symbol is the third symbol, and the quantity of symbols is 2). For another example, the symbol information may include a start slot location and a quantity of slots (for example, one subframe includes six slots, a start slot is the second slot, and the quantity of slots is 2). For still another example, the symbol information may alternatively include short-subframe quantity information and a short-subframe number (for example, one subframe includes six short subframes, and the short-subframe number in the symbol information is 3, or one subframe includes 14 short subframes, and the short-subframe number in the symbol information is 3), where the short-subframe quantity information is used to indicate a quantity of short subframes in each subframe. A quantity of symbols in the subframe that are occupied by the time-frequency resource used to send or receive the SPS data is 1 or larger than 1, but is less than 14. For example, the quantity of symbols in the subframe that are occupied by the time-frequency resource used to send or receive the SPS data may be 1, 2, 3, 4, 5, 6, 7, or the like. The SPS period length may be expressed in subframes (for example, the time interval between the two neighboring time-frequency resources used to send or receive the SPS data is one subframe, two subframes, or the like); or may be expressed in slots (for example, the time interval between the two neighboring time-frequency resources used to send or receive the SPS data is one slot, two slots, or the like); or may be expressed in symbols (for example, the time interval between the two neighboring time-frequency resources used to send or receive the SPS data is one symbol, two symbols, or the like). This is not limited in this embodiment of this application.

In addition, a form of expression of the symbol information in this embodiment is not limited to the foregoing several types. For example, the symbol information may include a start short-subframe location and a quantity of short subframes (for example, one subframe includes six short subframes, a start short-subframe is the second short subframe, and the quantity of short subframes is 2). For another example, the symbol information may alternatively include slot quantity information and a slot number (for example, one subframe includes six slots, and the slot number in the symbol information is 3).

Step S220. The network device 12 determines, based on an SPS period length, symbol information, and an SPS activation command in the SPS configuration parameter, resource locations of time-frequency resources available for sending or receiving SPS data.

In one embodiment, step S220 may have a plurality of forms of expression. For example, step S220 may include:

determining, by the network device 12 based on the symbol information and the SPS activation command, a resource location of the first time-frequency resource; and determining, by the network device 12 based on the SPS period length and the resource location of the first time-frequency resource, a resource location of a subsequent time-frequency resource available for sending or receiving the SPS data.

In this embodiment, the network device may determine, based on the indication of the SPS activation command, the system frame number and the subframe number of the first time-frequency resource. Then, the network device may determine, based on the indication of the symbol information, the location of the symbol that is the subframe corresponding to the subframe number and that is occupied by the first time-frequency resource (namely, the resource location of the first time-frequency resource). Based on this, the network device uses, as the resource location of the subsequent time-frequency resource available for sending or receiving the SPS data, a resource location determined by each addition of one SPS period to the resource location of the first time-frequency resource.

For another example, in step S220, the network device 12 may alternatively calculate, by using a predefined formula, the resource locations of the time-frequency resources available for sending or receiving the SPS data.

Step S230. The network device 12 sends the SPS configuration parameter to the terminal device 11.

In one embodiment, the network device 12 may send the SPS configuration parameter to the terminal device 11 by using a radio resource control (RRC) message, may send the SPS configuration parameter to the terminal device 11 by using media access control (MAC) signaling, or may send the SPS configuration parameter to the terminal device 11 through a physical layer control channel.

It should be particularly noted herein that, in this embodiment, there is no chronological order between step S220 and step S230.

Step S240. The terminal device 11 receives the SPS configuration parameter sent by the network device 12.

Step S250. The terminal device 11 determines, based on the SPS period length, the symbol information, and the SPS activation command in the SPS configuration parameter, the resource locations of the time-frequency resources available for sending or receiving the SPS data.

Corresponding to step S220, in one embodiment, step S250 may also have a plurality of forms of expression. For example, step S250 may include:

determining, by the terminal device 11 based on the symbol information and the SPS activation command, the resource location of the first time-frequency resource; and determining, by the terminal device 11 based on the SPS period length and the resource location of the first time-frequency resource, the resource location of the subsequent time-frequency resource available for sending or receiving the SPS data.

For another example, in step S250, the terminal device 11 may also calculate, by using the predefined formula, the resource locations of the time-frequency resources available for sending or receiving the SPS data.

For ease of understanding, a manner of calculating, by the network device 12 or the terminal device 11 by using the predefined formula, the resource locations of the time-frequency resources available for sending or receiving the SPS data is described below by using specific embodiments.

Embodiment 1

When the network device 12 sends the SPS data to the terminal device 11, in other words, when downlink transmission of the SPS data is performed between the network device 12 and the terminal device 11, the network device 12 calculates, by using a formula (1), the resource locations of the time-frequency resources available for sending the SPS data, and the terminal device 11 calculates, by using the formula (1), the resource locations of the time-frequency resources available for receiving the SPS data, where the formula (1) is as follows:

$$(10*SFN*slot\_number+subframe*slot\_number+slot\_id)=[(10*slot\_number*SFNstart\ time+slot\_number*subframestart\ time+slot\_idstart\ time)+N*semiPersistSchedIntervalDL]modulo\ 10240*slot\_number \quad (1)$$

In the formula (1), SFN represents system frame number (that is, a number of a radio frame), subframe is used to represent the subframe number, and slot_id is used to represent a number of a short subframe in the subframe. slot_number is used to represent the short-subframe quantity information in the symbol information, and slot_idstart time represents a short-subframe number that is at an SPS start time, in other words, is used to represent information about the short-subframe number in the symbol information. The network device 12 and the terminal device 11 may determine, by using slot_number and slot_idstart time, the location of the symbol that is in the subframe and that is occupied by the first time-frequency resource. SFNstart time represents a system frame number that is at the SPS start time, in other words, is used to represent the system frame number of the first time-frequency resource. subframestart time represents a subframe number that is at the SPS start time, in other words, is used to represent the subframe number of the first time-frequency resource. semiPersistSchedIntervalDL indicates that a downlink SPS resource is allocated to UE at an interval of a length of semiPersistSchedIntervalDL, and is used to represent the SPS period length. slot_number and slot_idstart time are located in the symbol information, and SFNstart time and subframestart time are located in the SPS activation command. N has an initial value of 0, and is increased by 1 after each SPS period length. modulo 10240 is used because a system frame is indicated by using 10 bits, and a value range of the system frame number is from 0 to 1023. One inversion needs to be performed at an interval of 1024 system frames. It should be noted herein that 10 and 10240 respectively indicate 10 subframes in one system frame and that a maximum value of an SFN is 1023, and 10240 indicates a quantity of subframes included in 1024 system frames. When a quantity of subframes in each system frame is not 10, a number in the formula (1) is changed. For example, when the quantity of subframes in the system frame is 8, "modulo 10240" in the formula (1) is changed to "modulo 8*1024".

In this embodiment, slot_number may be a quantity of slots or a quantity of sTTIs in each subframe. A value of slot_number may be 2, 6, 7, or the like. For example, when a length of each slot or each sTTI in one subframe is seven symbols, the value of slot_number is 2. For another example, when lengths of a plurality of slots or a plurality of sTTIs in one subframe are sequentially two symbols, two symbols, three symbols, two symbols, two symbols, and three symbols, the value of slot_number is 6. For still another example, when a length of each slot or each sTTI in one subframe is two symbols, the value of slot_number is 7, where an English full name of sTTI is shortened transmission time interval. sTTI indicates that a transmission time interval of data is less than 1 ms.

In this embodiment, when N is the initial value 0, on the left of the sign "=" in the formula (1), SFN=SFNstart time, subframe=subframestart time, and slot_id=slot_idstart time.

When the value of N is 1, the network device 12 and the terminal device 11 sequentially adjust values of slot_id, subframe, and SFN, to make the formula (1) satisfied, where a method used by the network device 12 and the terminal device 11 to sequentially adjust the values of slot_id, subframe, and SFN is: slot_id is sequentially increased by 1 starting from slot_idstart time; and each time when slot_id=slot_number−1, slot_id is sequentially increased by 1 starting from 0 again. When slot_id=slot_number−1 is satisfied for the first time, subframe is sequentially increased by 1 starting from subframestart time. Each time when subframe=9, subframe is sequentially increased by 1 starting from 0 again. When subframe=9 is satisfied for the first time, SFN is sequentially increased by 1 starting from SFNstart time. Each time when SFN=1023, SFN is sequentially increased by 1 starting from 0 again. When the formula (1) is satisfied, a location that is of a time-frequency resource and that corresponds to the values of slot_id, subframe, and SFN is a resource location of the second time-frequency resource available for sending or receiving the SPS data.

When the value of N is 2, the value of slot_id is sequentially increased by 1 based on the values of slot_id, subframe, and SFN that are obtained when the value of N is 1. Each time when slot_id=slot_number−1, slot_id is sequentially increased by 1 starting from 0 again, and the value of subframe is sequentially increased by 1. Each time when subframe=9, the value of SFN is sequentially increased by 1. Each time when SFN=1023, the value of SFN is sequentially increased by 1 starting from 0 again. When the formula (1) is satisfied, a location that is of a time-frequency resource and that corresponds to the values of slot_id, subframe, and SFN is a resource location of the third time-frequency resource available for sending or receiving the SPS data. The rest can be deduced by analogy. The network device 12 and the terminal device 11 can determine the resource locations of all the time-frequency resources available for sending or receiving the SPS data.

It should be noted that, each time when the value of N is increased by 1, to make the formula (1) satisfied, the terminal device 11 and the network device 12 may only need to adjust the value of slot_id, may only need to adjust the values of slot_id and subframe, or may need to adjust all the values of slot_id, subframe, and SFN. This is related to the length of semiPersistSchedIntervalDL. For example, when a length of each slot or each sTTI in one subframe is two symbols, if SFNstart time is 2, subframestart time is 3, slot_idstart time is 1, and semiPersistSchedIntervalDL is one slot or one sTTI, slot_id only needs to be adjusted to 3 when N is 1, slot_id only needs to be adjusted to 5 when N is 2, and the like.

Embodiment 2

When the terminal device 11 sends the SPS data to the network device 12, in other words, when uplink transmission of the SPS data is performed between the network device 12 and the terminal device 11, the network device 12 calculates, by using a formula (2), the resource locations of the time-frequency resources available for receiving the SPS data, and the terminal device 11 calculates, by using the formula (2), the resource locations of the time-frequency resources available for sending the SPS data, where the formula (2) is as follows:

$$(10*SFN*slot\_number+subframe*slot\_number+slot\_id)=[(10*slot\_number*SFNstart\ time+slot\_number*subframestart\ time+slot\_idstart\ time)+N*semiPersistSchedIntervalUL+Subframe\_Offset*(N\ modulo\ 2)]modulo\ 10240*slot\_number \quad (2)$$

In the formula (2), SFN represents system frame number (that is, a number of a radio frame), subframe is used to represent the subframe number, and slot_id is used to represent a number of a short subframe in the subframe. slot_number is used to represent the short-subframe quantity information in the symbol information, and slot_idstart time represents a short-subframe number that is at an SPS start time, in other words, is used to represent information about the short-subframe number in the symbol information. The network device 12 and the terminal device 11 may determine, by using slot_number and slot_idstart time, the location of the symbol that is in the subframe and that is occupied by the first time-frequency resource available for receiving or sending the SPS data. SFNstart time represents a system frame number that is at the SPS start time, in other words, is used to represent the system frame number of the first time-frequency resource. subframestart time represents a subframe number that is at the SPS start time, in other words, is used to represent the subframe number of the first time-frequency resource. semiPersistSchedIntervalUL indicates that an uplink SPS resource is allocated to UE at an interval of a length of semiPersistSchedIntervalUL, and is used to represent the SPS period length. Subframe_Offset* (N modulo 2) represents an uplink SPS offset. Subframe_Offset is applied to a time division duplex (TDD) scenario and is set to 0 in a frequency division duplex (FDD) scenario, and is used to indicate whether the subframe needs to be switched. slot_number and slot_idstart time are located in the symbol information, and SFNstart time and subframestart time are located in the SPS activation command. N has an initial value of 0, and is increased by 1 after each SPS period length. modulo 10240 is used because a system frame is indicated by using 10 bits, and a value range of the system frame number is from 0 to 1023. One inversion needs to be performed at an interval of 1024 system frames. It should be noted herein that 10 and 10240 respectively indicate 10 subframes in one system frame and that a maximum value of SFN is 1023, and 10240 indicates a quantity of subframes included in 1024 system frames. When a quantity of subframes in each system frame is not 10, a number in the formula (2) is changed. For example, when the quantity of subframes in the system frame is 8, "modulo 10240" in the formula (2) is changed to "modulo 8*1024".

In this embodiment, slot_number may be a quantity of slots or a quantity of sTTIs in each subframe. A value of slot_number may be 2, 6, 7, or the like. For example, when a length of each slot or each sTTI in one subframe is seven symbols, the value of slot_number is 2. For another example, when lengths of a plurality of slots or a plurality of sTTIs in one subframe are sequentially two symbols, two symbols, three symbols, two symbols, two symbols, and three symbols, the value of slot_number is 6. For still another example, when a length of each slot or each sTTI in one subframe is two symbols, the value of slot_number is 7, where an English full name of sTTI is shortened transmission time interval. sTTI indicates that a transmission time interval of data is less than 1 ms.

In this embodiment, when N is the initial value 0, on the left of the sign "=" in the formula (2), SFN=SFNstart time, subframe=subframestart time, and slot_id=slot_idstart time.

When the value of N is 1, the network device 12 and the terminal device 11 sequentially adjust values of slot_id, subframe, and SFN, to make the formula (2) satisfied, where a method used by the network device 12 and the terminal device 11 to sequentially adjust the values of slot_id, subframe, and SFN is: slot_id is sequentially increased by 1 starting from slot_idstart time; and each time when slot_id=slot_number−1, slot_id is sequentially increased by 1 starting from 0 again. When slot_id=slot_number−1 is satisfied for the first time, subframe is sequentially increased by 1 starting from subframestart time. Each time when subframe=9, subframe is sequentially increased by 1 starting from 0 again. When subframe=9 is satisfied for the first time, SFN is sequentially increased by 1 starting from SFNstart time. Each time when SFN=1023, SFN is sequentially increased by 1 starting from 0 again. When the formula (2) is satisfied, a location that is of a time-frequency resource and that corresponds to the values of slot_id, subframe, and SFN is a resource location of the second time-frequency resource available for sending or receiving the SPS data.

When the value of N is 2, the value of slot_id is sequentially increased by 1 based on the values of slot_id, subframe, and SFN that are obtained when the value of N is 1. Each time when slot_id=slot_number−1, slot_id is sequentially increased by 1 starting from 0 again, and the value of subframe is sequentially increased by 1. Each time when subframe=9, the value of SFN is sequentially increased by 1. Each time when SFN=1023, the value of SFN is sequentially increased by 1 starting from 0 again. When the formula (2) is satisfied, a location that is of a time-frequency resource and that corresponds to the values of slot_id, subframe, and SFN is a resource location of the third time-frequency resource available for sending or receiving the SPS data. The rest can be deduced by analogy. The network device 12 and the terminal device 11 can determine the resource locations of all the time-frequency resources available for sending or receiving the SPS data.

It should be noted that, each time when the value of N is increased by 1, to make the formula (2) satisfied, the terminal device 11 and the network device 12 may only need to adjust the value of slot_id, may only need to adjust the values of slot_id and subframe, or may need to adjust all the values of slot_id, subframe, and SFN. This is related to the length of semiPersistSchedIntervalUL. For example, when a length of each slot or each sTTI in one subframe is two symbols, if SFNstart time is 2, subframestart time is 3, slot_idstart time is 1, and semiPersistSchedIntervalUL is one slot or one sTTI, slot_id only needs to be adjusted to 3 when N is 1, slot_id only needs to be adjusted to 5 when N is 2, and the like.

After the network device 12 completes step S220 and the terminal device completes step S250, the network device 12 and the terminal device 11 may send or receive the SPS data on the time-frequency resource available for sending or receiving the SPS data.

In one embodiment, the network device determines the semi-persistent scheduling SPS configuration parameter, where the SPS configuration parameter includes the SPS period length, the symbol information, and the SPS activation command, where the SPS activation command is used to indicate the system frame number and the subframe number of the first time-frequency resource, and the symbol information is used to indicate the location of the symbol that is in the subframe and that is occupied by the first time-frequency resource; then, the network device sends the SPS configuration parameter to the terminal device; and the network device and the terminal device determine, based on the SPS period length, the symbol information, and the SPS activation command, the resource locations of the time-frequency resources available for sending or receiving the SPS data. In this embodiment, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In addition, in this embodiment, when the SPS data is transmitted between the network device and the terminal device, the used time-frequency resource is on a symbol level. Therefore, in the technical solution in this embodiment, a transmission delay of the SPS data is less than 1 ms, so that the transmission delay of the SPS data can be reduced.

In one embodiment, the SPS configuration parameter may further include a first offset, and the semi-persistent scheduling method shown in FIG. 2 may further include:

when the time-frequency resource available for sending or receiving the SPS data is partially or completely occupied, calculating, by the network device 12, an offset time-frequency resource based on the first offset; further calculating, by the terminal device 11, the offset time-frequency resource based on the first offset; and receiving or sending, by the network device 12 and the terminal device, the SPS data on the offset time-frequency resource.

In one embodiment, for that the time-frequency resource available for sending or receiving the SPS data is partially or completely occupied, there are a plurality of cases. For example, a PDCCH is configured on the time-frequency resource available for sending or receiving the SPS data. For another example, other data is being transmitted between the network device 12 and the terminal device 11 on the time-frequency resource available for sending or receiving the SPS data. For still another example, there are a plurality of SPSs between the network device 12 and the terminal device 11, and the time-frequency resource that is available for sending or receiving the SPS data and that is determined during the SPS in this embodiment of this application partially or completely overlaps that determined during one or more other SPSs. In this case, mutual interference exists when the network device 12 sends or receives the SPS data on the time-frequency resource available for sending or receiving the SPS data. Therefore, the network device 12 and the terminal device 11 add the first offset to the resource location of the time-frequency resource available for sending or receiving the SPS data, to calculate the offset time-frequency resource, and then the network device 12 and the terminal device 11 receive or send the SPS data on the offset time-frequency resource, thereby ensuring normal transmission of the SPS data between the network device 12 and the terminal device 11.

A value of the first offset is not limited in this embodiment. For example, the first offset may be one symbol, two symbols, or the like; or may be one slot, two slots, or the like; or may be one SPS period, two SPS periods, or the like. This implementation is described below by using one embodiment.

In addition, in one embodiment, the first offset may alternatively be pre-configured on the network device 12 and the terminal device 11 by using a protocol. Then, both the network device 12 and the terminal device 11 may calculate the offset time-frequency resource by using the pre-configured first offset, and receive or send the SPS data on the offset time-frequency resource.

Figure 3:
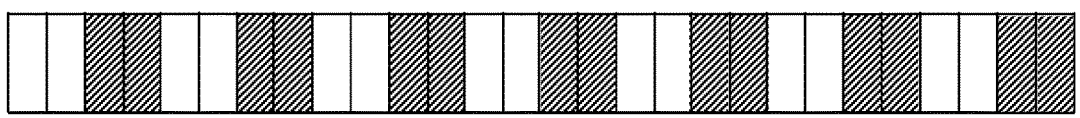
FIG. 3 is a schematic diagram of a resource location of a time-frequency resource for SPS data according to one embodiment.

As shown in FIG. 3, a length of each slot in one subframe is two symbols, and an SPS period length is one slot. The resource locations, determined in the embodiment shown in FIG. 2, of the time-frequency resources available for sending or receiving the SPS data are shown in a shadow part in FIG. 3.

Figure 4:
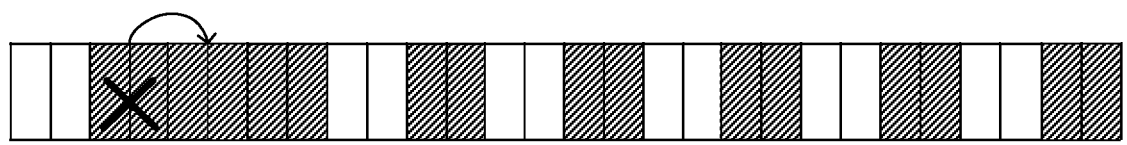
FIG. 4 is a schematic diagram of an offset resource location of a time-frequency resource for SPS data according to one embodiment.
Figure 5:
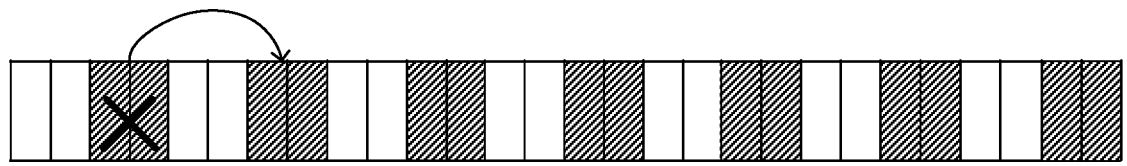
FIG. 5 is a schematic diagram of another offset resource location of a time-frequency resource for SPS data according to one embodiment.

An example in which a time-frequency resource corresponding to the first shadow in FIG. 3 is partially or completely occupied is used for description. When a first offset is one slot, an offset time-frequency resource is shown in FIG. 4. When the first offset is two SPS period lengths, an offset time-frequency resource is shown in FIG. 5. To be specific, a resource location of a current time-frequency resource available for sending or receiving SPS data is skipped, and the SPS data is sent or received at a resource location of the next time-frequency resource available for sending or receiving the SPS data.

In addition, in one embodiment, the semi-persistent scheduling method shown in FIG. 2 may further include:

when the time-frequency resource available for sending or receiving the SPS data is partially occupied, sending or receiving, by the network device 12 and the terminal device 11, the SPS data on an unoccupied time-frequency resource available for sending or receiving the SPS data.

Figure 6:
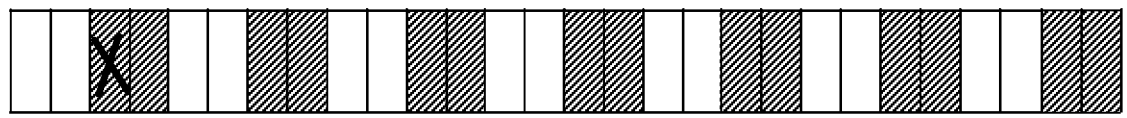
FIG. 6 is a schematic diagram of another resource location of a time-frequency resource for SPS data according to one embodiment.

An example in which the former symbol in the time-frequency resource corresponding to the first shadow in FIG. 3 is occupied is used for description. In this case, as shown in FIG. 6, the network device 12 and the terminal device 11 may send or receive the SPS data on the latter symbol in the time frequency resource corresponding to the first shadow. In this case, the network device and the terminal device 11 send or receive the SPS data according to an original modulation and coding scheme (MCS). However, a transport block size (TBS) corresponding to the SPS data is reduced by half.

In this embodiment, when the time-frequency resource available for sending or receiving the SPS data is partially occupied, the network device 12 and the terminal device 11 may send or receive the time-frequency resource on the unoccupied time-frequency resource available for sending or receiving the SPS data, so that the unoccupied part of the time-frequency resource available for sending or receiving the SPS data is used, thereby improving the resource utilization.

In one embodiment, the SPS configuration parameter may further include SPS priority information, and the semi-persistent scheduling method shown in FIG. 2 may further include:

when the time-frequency resource available for sending or receiving the SPS data partially or completely overlaps another SPS time-frequency resource, determining, by the network device 12 and the terminal device 11 based on the SPS priority information, a behavior of sending or receiving the SPS data.

In this embodiment, the SPS priority information is used to indicate a priority of the SPS data. In this case, when there are a plurality of SPSs between the network device 12 and the terminal device 11, if time-frequency resources that are available for sending or receiving SPS data and that are determined during the plurality of SPSs partially or completely overlap, the network device 12 and the terminal device 11 may determine a priority of SPS data based on the SPS priority information in the SPS configuration parameter. Then, the network device 12 and the terminal device 11 may determine, based on a priority of each piece of SPS data, a behavior of sending or receiving the piece of SPS data. In one embodiment, for SPS data having a highest priority, the network device 12 and the terminal device 11 use a time-frequency resource available for sending or receiving the SPS data to send or receive the SPS data. For SPS data whose priority is not the highest, the network device may not send or receive the SPS data; or may add one or more second offsets to a resource location of a time-frequency resource available for sending or receiving the SPS data, where a lower priority of the SPS data indicates more added second offsets. Then, the network device 12 and the terminal device send or receive the SPS data on an offset time-frequency resource. A value of the second offset is not limited in this embodiment of this application. For example, the second offset may be one symbol, two symbols, or the like; or may be one slot, two slots, or the like; or may be one SPS period, two SPS periods, or the like. The second offset herein may be the same as or different from the first offset.

In one embodiment, the SPS priority information may be a communication physical characteristic (Numerology). The numerology corresponds to a set of different parameters used in a communications system. Different numerologies may correspond to different parameters. The numerology includes, but is not limited to, one of or any combination of the following parameters: a subcarrier width, a cyclic prefix (CP) length, a transmission time interval (TTI), a quantity of symbols, a resource block (RB) location, a slot length, and a frame format. In an example, a reader may obtain the proposal R1-1613779 or R2-168012 from www.3gpp.org to understand a meaning of the numerology. Content of these proposals is included in content of this application. Due to fairness and openness of the 3GPP standardization organization, details are not described herein.

In one embodiment, the SPS configuration parameter may further include carrier information, beam information, cell information, cell group information, or logical channel information, and the semi-persistent scheduling method shown in FIG. 2 may further include:

determining, by the network device 12 and the terminal device 11 based on the carrier information, the beam information, the cell information, the cell group information, or the logical channel information, a carrier, a beam, a cell, a cell group, or a logical channel for sending or receiving the SPS data.

The carrier information herein may be a carrier ID, the beam information may be a beam ID, the cell information may be a cell ID, and the cell group information may be a cell group ID, where an English full name of ID in this specification is identity, and is translated into an identifier, an identity, or identification in Chinese.

In this embodiment, the SPS configuration parameter includes the carrier information, the beam information, the cell information, the cell group information, or the logical channel information. Therefore, the network device 12 and the terminal device 11 may determine, based on the carrier information, the beam information, the cell information, the cell group information, or the logical channel information, the carrier, the beam, the cell, the cell group, or the logical channel for sending or receiving the SPS data, to determine an area range in which the semi-persistent scheduling is used.

In addition, when the SPS configuration parameter further includes the carrier information, the beam information, the cell information, the cell group information, or the logical channel information, in addition to the SPS period length, the symbol information, and the SPS activation command, the network device 12 and the terminal device 11 may further use the carrier information, the beam information, the cell information, the cell group information, the logical channel information, or the like to determine the resource locations of the time-frequency resources available for sending or receiving the SPS data.

In one embodiment, the SPS configuration parameter may further include a quantity of hybrid automatic repeat requests HARQs, and the semi-persistent scheduling method shown in FIG. 2 may further include:

determining, by the network device, a HARQ ID based on the quantity of HARQs and the resource location of the time-frequency resource available for sending the SPS data.

In this embodiment, the SPS configuration parameter further includes the quantity of HARQs, so that when downlink transmission of the SPS data is performed between the network device and the terminal device, the network device may determine the HARQ ID based on the quantity of HARQs and the resource location of the time-frequency resource available for sending the SPS data.

A manner of calculating the HARQ ID is described below by using one embodiment.

After the terminal device 11 receives the SPS data at the resource location of the time-frequency resource available for sending or receiving the SPS data, the HARQ ID starts to be calculated in the embodiment shown in FIG. 2. For the calculation of the HARQ ID, refer to formulas (3) and (4):

HARQ ID=[floor(CURRENT_Slot*slot_id/semiPersistSchedIntervalDL)]modulo numberOfConfSPS-Processes     (3)

CURRENT_Slot=[(SFN*10)*slot_number+subframe*slot_number+slot_id]     (4), where definitions of SFN, slot_number, subframe number, slot_id, and semiPersistSchedIntervalDL herein are the same as those in Embodiment 1, and details are not described herein again. numberOfConfSPS-Processes represents the quantity of HARQs.

In addition, when the SPS configuration parameter further includes the quantity of HARQs, in addition to the SPS period length, the symbol information, and the SPS activation command, the network device 12 and the terminal device 11 may further use the quantity of HARQs or the like to determine the resource locations of the time-frequency resources available for sending or receiving the SPS data.

In one embodiment, the SPS configuration parameter further includes an SPS radio network temporary identifier (SPS-RNTI).

In this embodiment, the network device 12 may distinguish different service information based on the SPS radio network temporary identifier. For example, the SPS-RNTI in this embodiment is specific to an SPS service, and other RNTIs are specific to other services such as a multimedia broadcast multicast service (MBMS).

In one embodiment, when there are a plurality of SPSs between the network device 12 and the terminal device 11, each SPS configuration parameter may further include cell information, carrier information, frequency domain location information, and the like.

The cell information herein is cell information. For example, the cell information may include cell ID information; the carrier information herein may include carrier ID information, carrier frequency information, and the like. The frequency domain location information herein is used to indicate a specific location of a physical resource block (PRB).

In one embodiment, when there are a plurality of SPSs between the network device 12 and the terminal device 11, a resource location of a time-frequency resource that is used in each SPS and that is available for sending or receiving SPS data is separately calculated.

In one embodiment, when there are a plurality of SPSs between the network device 12 and the terminal device 11 and each SPS configuration parameter further includes the SPS priority information, if time-frequency resources that are available for sending or receiving SPS data and whose resource locations are separately calculated for the plurality of SPSs partially or completely overlap, for SPS data having a highest priority, the network device 12 and the terminal device 11 use the time-frequency resource available for sending or receiving the SPS data to send or receive the SPS data. For SPS data having a lower priority, the network device 12 and the terminal device 11 may add one or more second offsets to the resource location of the time-frequency resource available for sending or receiving the SPS data, where a lower SPS priority indicates a larger quantity of times of adding the second offset. Then, the network device 12 and the terminal device 11 send or receive the SPS data on an offset time-frequency resource.

In one embodiment, when there are a plurality of SPSs between the network device 12 and the terminal device 11, during calculation of a HARQ ID of each SPS, the HARQ ID may be separately calculated, or may be calculated by using an offset. For example, a HARQ ID calculated for the first SPS is m, and a HARQ ID calculated for the second SPS is m+n. n may be a quantity of HARQs in a carrier, a cell, or a HARQ entity that corresponds to the first SPS, or may be a fixed value.

In one embodiment, when there are a plurality of SPSs between the network device 12 and the terminal device 11, different SPSs may be activated or deactivated by using a same SPS-RNTI, or a separate SPS-RNTI may be used for each SPS.

It should be noted that, in this specification, when the semi-persistent scheduling is performed between the network device 12 and the terminal device 11, and when the network device sends the SPS data, the terminal device receives the SPS data; or when the terminal device sends the SPS data, the network device receives the SPS data.

Corresponding to the foregoing method embodiment, the embodiments of this application further provide corresponding embodiments of apparatuses such as the terminal device and the network device.

Figure 7:
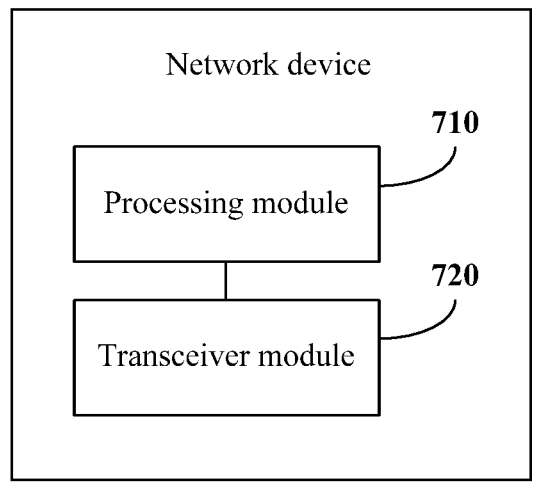
FIG. 7 is a schematic structural diagram of a network device according to one embodiment.

FIG. 7 is a schematic structural diagram of a network device according to one embodiment. The network device may include a processing module 710 and a transceiver module 720.

The processing module 710 is configured to: determine a semi-persistent scheduling SPS configuration parameter, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; and determine, based on the SPS period length, the symbol information, and the SPS activation command, resource locations of time-frequency resources available for sending or receiving the SPS data.

The transceiver module 720 is configured to send the SPS configuration parameter to a terminal device.

According to the network device provided in this embodiment of this application, first, the processing module determines the semi-persistent scheduling SPS configuration parameter, where the SPS configuration parameter includes the SPS period length, the symbol information, and the SPS activation command, where the SPS activation command is used to indicate the system frame number and the subframe number of the first time-frequency resource, and the symbol information is used to indicate the location of the symbol that is in the subframe and that is occupied by the first time-frequency resource; then the processing module determines, based on the SPS period length, the symbol information, and the SPS activation command, the resource locations of the time-frequency resources available for sending or receiving the SPS data; at last, the transceiver module sends the SPS configuration parameter to the terminal device. In this embodiment, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In addition, in this embodiment, when the SPS data is transmitted between the network device and the terminal device, the used time-frequency resource is on a symbol level. Therefore, in the technical solution in this embodiment, a transmission delay of the SPS data is less than 1 ms, so that the transmission delay of the SPS data can be reduced.

In one embodiment, the processing module 710 is configured to: determine, based on the symbol information and the SPS activation command, a resource location of the first time-frequency resource; and determine, based on the SPS period length and the resource location of the first time-frequency resource, a resource location of a subsequent time-frequency resource available for sending or receiving the SPS data.

In one embodiment, the symbol information includes a start symbol location and a quantity of symbols, or includes short-subframe quantity information and a short-subframe number, where the short-subframe quantity information is used to indicate a quantity of short subframes in each subframe.

In one embodiment, the transceiver module 720 is further configured to send or receive the SPS data on the time-frequency resource available for sending or receiving the SPS data.

In one embodiment, the SPS configuration parameter further includes a first offset; the processing module 710 is further configured to: when the time-frequency resource available for sending or receiving the SPS data is partially or completely occupied, calculate an offset time-frequency resource based on the first offset; and the transceiver module 720 is further configured to receive or send the SPS data on the offset time-frequency resource.

In one embodiment, the transceiver module 720 is further configured to: when the time-frequency resource available for sending or receiving the SPS data is partially occupied, send or receive the SPS data on an unoccupied time-frequency resource available for sending or receiving the SPS data.

In one embodiment, the SPS configuration parameter further includes SPS priority information, and the processing module 710 is further configured to: when the time-frequency resource available for sending or receiving the SPS data partially or completely overlaps another SPS time-frequency resource, determine, based on the SPS priority information, a behavior of sending or receiving the SPS data.

In one embodiment, the SPS configuration parameter further includes carrier information, beam information, cell information, cell group information, or logical channel information. The processing module 710 is further configured to determine, based on the carrier information, the beam information, the cell information, the cell group information, or the logical channel information, a carrier, a beam, a cell, a cell group, or a logical channel for sending or receiving the SPS data.

In one embodiment, the SPS configuration parameter further includes a quantity of hybrid automatic repeat requests HARQs. The processing module 710 is further configured to determine a HARQ ID based on the quantity of HARQs and the resource location of the time-frequency resource available for sending the SPS data.

In one embodiment, the SPS configuration parameter further includes an SPS radio network temporary identifier.

Figure 8:
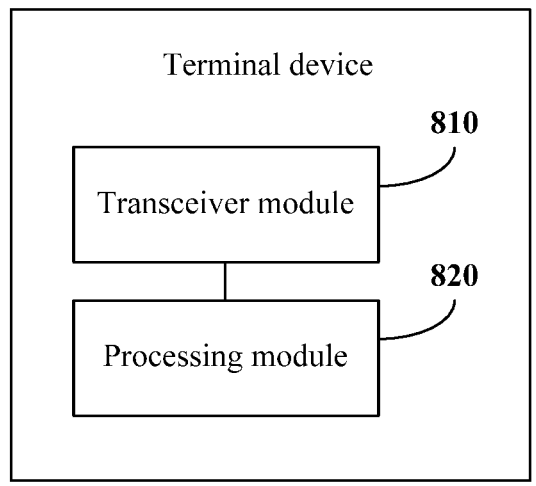
FIG. 8 is a schematic structural diagram of a terminal device according to one embodiment.

FIG. 8 is a schematic structural diagram of a terminal device according to one embodiment. The terminal device may include a transceiver module 810 and a processing module 820.

The transceiver module 810 is configured to receive a semi-persistent scheduling SPS configuration parameter sent by a network device, where the SPS configuration parameter includes an SPS period length, symbol information, and an SPS activation command, where the SPS activation command is used to indicate a system frame number and a subframe number of a first time-frequency resource available for sending or receiving SPS data, and the symbol information is used to indicate a location of a symbol that is in a subframe and that is occupied by the first time-frequency resource.

The processing module 820 is configured to determine, based on the SPS period length, the symbol information, and the SPS activation command, resource locations of time-frequency resources available for sending or receiving the SPS data.

In one embodiment, the transceiver module 810 receives the semi-persistent scheduling SPS configuration parameter sent by the network device, where the SPS configuration parameter includes the SPS period length, the symbol information, and the SPS activation command, where the SPS activation command is used to indicate the system frame number and the subframe number of the first time-frequency resource, and the symbol information is used to indicate the location of the symbol that is in the subframe and that is occupied by the first time-frequency resource; and then the processing module determines, based on the SPS period length, the symbol information, and the SPS activation command, the resource locations of the time-frequency resources available for sending or receiving the SPS data. In this embodiment, the terminal device and the network device may determine, based on the indication of the symbol information, the location of the symbol that is in the subframe and that is occupied by the time-frequency resource available for sending or receiving the SPS data. Therefore, the time-frequency resource available for sending or receiving the SPS data is restricted to one or more symbols in the subframe, so that the network device and the terminal device can transmit other data on a remaining symbol resource in the same subframe, thereby improving resource utilization during semi-persistent scheduling. In one embodiment, when the SPS data is transmitted between the network device and the terminal device, the used time-frequency resource is on a symbol level. Therefore, in the technical solution in this embodiment of this application, a transmission delay of the SPS data is less than 1 ms, so that the transmission delay of the SPS data can be reduced.

In one embodiment, the processing module 820 is configured to: determine, based on the symbol information and the SPS activation command, a resource location of the first time-frequency resource; and determine, based on the SPS period length and the resource location of the first time-frequency resource, a resource location of a subsequent time-frequency resource available for sending or receiving the SPS data.

In one embodiment, the symbol information includes a start symbol location and a quantity of symbols, or includes short-subframe quantity information and a short-subframe number, where the short-subframe quantity information is used to indicate a quantity of short subframes in each subframe.

In one embodiment, the transceiver module 810 is further configured to send or receive the SPS data on the time-frequency resource available for sending or receiving the SPS data.

In one embodiment, the SPS configuration parameter further includes a first offset; the processing module 820 is further configured to: when the time-frequency resource available for sending or receiving the SPS data is partially or completely occupied, calculate an offset time-frequency resource based on the first offset; and the transceiver module 810 is further configured to receive or send the SPS data on the offset time-frequency resource.

In one embodiment, the transceiver module 810 is further configured to: when the time-frequency resource available for sending or receiving the SPS data is partially occupied, send or receive the SPS data on an unoccupied time-frequency resource available for sending or receiving the SPS data.

In one embodiment, the SPS configuration parameter further includes SPS priority information, and the processing module 820 is further configured to: when the time-frequency resource available for sending or receiving the SPS data partially or completely overlaps another SPS time-frequency resource, determine, based on the SPS priority information, a behavior of sending or receiving the SPS data.

In one embodiment, the SPS configuration parameter further includes carrier information, beam information, cell information, cell group information, or logical channel information. The processing module 820 is further configured to determine, based on the carrier information, the beam information, the cell information, the cell group information, or the logical channel information, a carrier, a beam, a cell, a cell group, or a logical channel for sending or receiving the SPS data.

In one embodiment, the SPS configuration parameter further includes a quantity of hybrid automatic repeat requests HARQs. The processing module 820 is further configured to determine a HARQ ID based on the quantity of HARQs and the resource location of the time-frequency resource available for sending the SPS data.

In one embodiment, the SPS configuration parameter further includes an SPS radio network temporary identifier.

Figure 9:
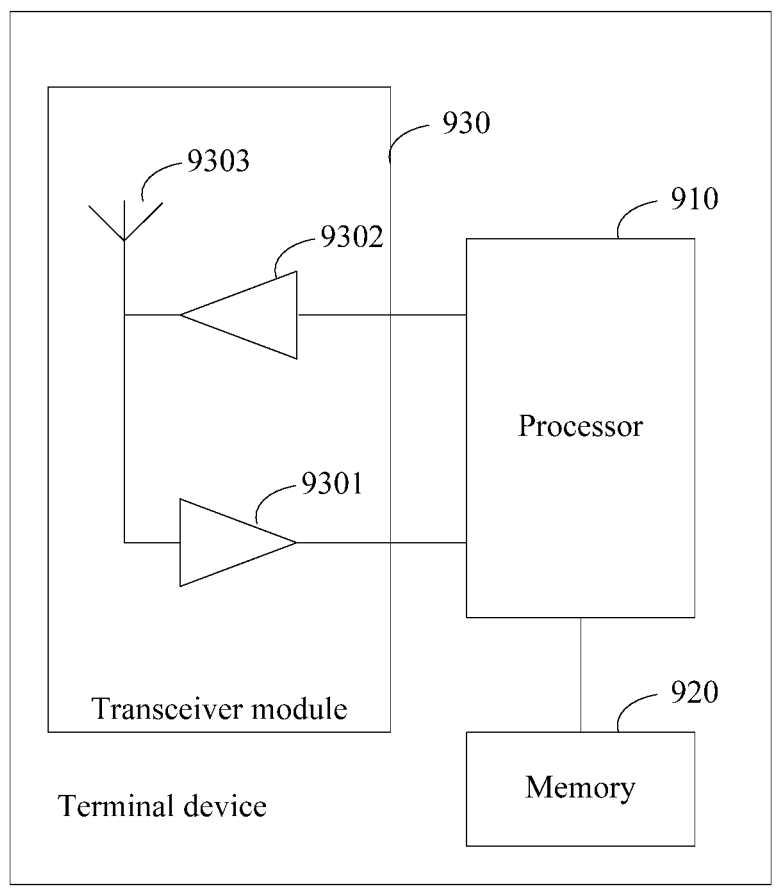
FIG. 9 is a schematic structural diagram of another terminal device according to one embodiment.

FIG. 9 is a schematic structural diagram of a terminal device according to one embodiment. The terminal device may be the terminal device in any of the foregoing embodiments, and is configured to implement the steps of the methods in the foregoing embodiments.

As shown in FIG. 9, the terminal device may include a processor 910, a memory 920, and a transceiver module 930. The transceiver module 930 may include components such as a receiver 9301, a transmitter 9302, and an antenna 9303. The terminal device may alternatively include more or fewer components, or a combination of some components, or components differently arranged. This is not limited in this application.

The processor 910 is a control center of the terminal device, and is connected to all parts of the entire terminal device by using various interfaces and lines. The processor 910 runs or executes a software program and/or a module stored in the memory 920, and invokes data stored in the memory 920, to perform various functions of the terminal device and/or process data. The processor 910 may include an integrated circuit (IC), for example, may include a single packaged IC, or may include a plurality of packaged ICs that have same functions or different functions and that are connected to each other. For example, the processor 910 may include only a central processing unit (CPU), or may be a combination of a graphics processing unit (GPU), a digital signal processor (DSP), and a control chip (such as a baseband chip) in the transceiver module. In some embodiments, the CPU may be a single operation core, or may include a plurality of operation cores.

The transceiver module 930 is configured to establish a communications channel, so that the terminal device is connected to a receiving device through the communications channel, to implement data transmission between terminal devices. The transceiver module may include communications modules such as a wireless local area network (WLAN) module, a Bluetooth module, and a baseband module, and a radio frequency (RF) circuit corresponding to the communications module, to perform wireless local area network communication, Bluetooth communication, infrared communication, and/or cellular communications system communication, for example, communication in wideband code division multiple access (WCDMA) and/or high speed downlink packet access (HSDPA). The transceiver module is configured to control communication between the components in the terminal device, and can support direct memory access.

In different implementations of this application, each transceiver module in the transceiver module 930 is usually implemented in a form of an integrated circuit chip, and may be selectively combined. There is no need to include all transceiver modules and corresponding antenna groups. For example, the transceiver module 930 may include only a baseband chip, a radio frequency chip, and a corresponding antenna, to provide a communication function in a cellular communications system. The terminal device may be connected to a cellular network or the Internet through a wireless communication connection, for example, wireless local area network access or WCDMA access that is established by the transceiver module. In some embodiments, the communications module, for example, the baseband module, in the transceiver module may be integrated into the processor. A typical example is an APQ+MDM series platform provided by Qualcomm. The radio frequency circuit is configured to receive and send information or receive and send a signal in a call process. For example, the radio frequency circuit receives downlink information from a network device and then sends the downlink information to the processor for processing; and sends uplink-related data to the network device. Usually, the radio frequency circuit includes a well-known circuit configured to perform these functions. The well-known circuit includes but is not limited to, an antenna system, a radio frequency transceiver, one or more amplifiers, a tuner, one or more oscillators, a digital signal processor, a codec chipset, a subscriber identity module (SIM) card, and a memory. In addition, the radio frequency circuit may further communicate with a network and another device through wireless communication. Any communication standard or protocol may be used for the wireless communication, and includes but is not limited to, global system for mobile communications (GSM), general packet radio service (GPRS), code division multiple access (CCDMA), wideband code division multiple access (WCDMA), high speed uplink packet access (HSUPA), long term evolution (LTE), email, and short messaging service (SMS).

In this embodiment, a function needing to be implemented by the transceiver module 720 may be implemented by the transceiver module 930 of the terminal device, or may be implemented by the transceiver module 930 controlled by the processor 910. A function needing to be implemented by the processing module 710 may be implemented by the processor 910.

Figure 10:
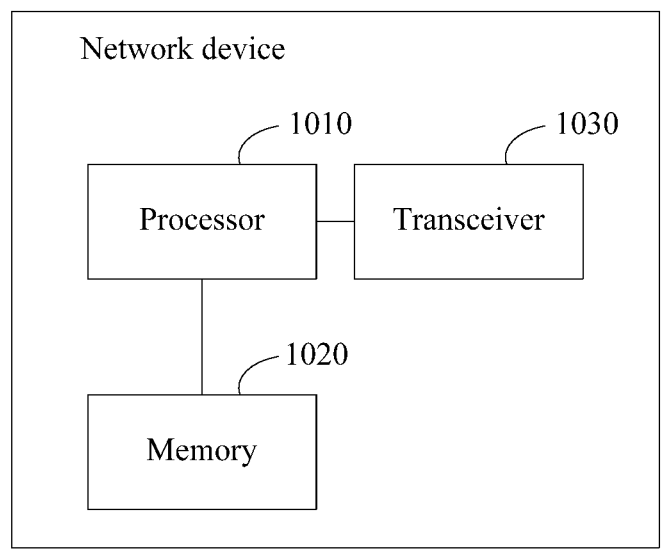
FIG. 10 is a schematic structural diagram of another network device according to one embodiment.

FIG. 10 is a schematic structural diagram of a network device according to one embodiment. The network device may be the network device in any of the foregoing embodiments, and is configured to implement the steps of the methods in the foregoing embodiments.

The network device may include a processor 1010, a memory 1020, a transceiver 1030, and the like.

The processor 1010 is a control center of the network device, and is connected to all parts of the entire network device by using various interfaces and lines. The processor 1010 runs or executes a software program and/or a module stored in the memory, and invokes data stored in the memory 1020, to perform various functions of the network device and/or process data. The processor 1010 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1020 may include a volatile memory, for example, a random access memory (RAM); or may include a non-volatile memory, for example, a flash memory, a hard disk drive (HDD), or a solid-state drive (SSD). Alternatively, the memory 1020 may include a combination of the foregoing types of memories. The memory may store a program or code. The processor 1010 in the network device executes the program or the code to implement functions of the network device.

The transceiver 1030 may be configured to receive or send data. The transceiver may send data to a terminal device or another network device under control of the processor. The transceiver receives, under control of the processor, data sent by the terminal device or the other network device.

In this embodiment, a function needing to be implemented by the transceiver module 810 may be implemented by the transceiver 1030 of the network device, or may be implemented by the transceiver 1030 controlled by the processor 1010. A function needing to be implemented by the processing module 820 may be implemented by the processor 1010.

In one embodiment, a computer storage medium is provided, where the computer storage medium may store a program, and when the program is executed, some or all of the steps in the embodiments of the semi-persistent scheduling method provided in this application may be performed. The storage medium may be a magnetic disk, an optical disc, a read-only memory (ROM), a random access memory (RAM), or the like.

A person skilled in the art may clearly understand that, the technologies in the embodiments of this application may be implemented by software in addition to a necessary commodity hardware platform. Based on such an understanding, the technical solutions in the embodiments of this application essentially or the part contributing to the prior art may be implemented in a form of a software product. The computer software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of this application.

The embodiments in this specification are all described in a progressive manner. For same or similar parts in the embodiments, cross reference may be made to these embodiments, and each embodiment focuses on a difference from other embodiments. Especially, system and apparatus embodiments are basically similar to a method embodiment, and therefore are described briefly. For related parts, refer to descriptions in the method embodiment.

What is claimed is:

1. A method of semi-persistent scheduling, comprising:
determining, by a network device, a semi-persistent scheduling (SPS) configuration parameter, wherein the SPS configuration parameter comprises an SPS period length, symbol information, an SPS activation command, and a first period offset, wherein the SPS activation command is used to indicate a system frame number and a subframe number of a first time-frequency resource available for sending or receiving SPS data, and the symbol information is used to indicate a location of a symbol that is in a subframe and that is occupied by the first time-frequency resource;
determining, by the network device, resource locations of time-frequency resources available for sending or receiving the SPS data based on the SPS period length, the symbol information, and the SPS activation command;
sending, by the network device, the SPS configuration parameter to a terminal device; and
when a time-frequency resource available for sending or receiving the SPS data is partially or completely occupied, calculating, by the network device, an offset time-frequency resource based on the first period offset, and receiving or sending the SPS data on the offset time-frequency resource.

2. The method according to claim 1, wherein determining the resource locations of the time-frequency resources available for sending or receiving the SPS data comprises:
determining, by the network device, a resource location of the first time-frequency resource based on the symbol information and the SPS activation command; and determining, by the network device, a resource location of a subsequent time-frequency resource available for sending or receiving the SPS data based on the SPS period length and the resource location of the first time-frequency resource.

3. The method according to claim 1, wherein the symbol information comprises a start symbol location and a quantity of symbols, or comprises short-subframe quantity information and a short-subframe number, wherein the short-subframe quantity information is used to indicate a quantity of short subframes in each subframe.

4. The method according to claim 1, further comprising:
when the time-frequency resource available for sending or receiving the SPS data is partially occupied, sending or receiving, by the network device, the SPS data on an unoccupied part of the time-frequency resource available for sending or receiving the SPS data.

5. The method according to claim 1,
wherein the SPS configuration parameter further comprises SPS priority information; and
further comprising: when the time-frequency resource available for sending or receiving the SPS data partially or completely overlaps another SPS time-frequency resource, determining, by the network device, a behavior of sending or receiving the SPS data based on the SPS priority information.

6. A network device, comprising:
a processor configured to: determine a semi-persistent scheduling (SPS) configuration parameter, wherein the SPS configuration parameter comprises an SPS period length, symbol information, an SPS activation command, and a first period offset, wherein the SPS activation command is used to indicate a system frame number and a subframe number of a first time-frequency resource available for sending or receiving SPS data, and the symbol information is used to indicate a location of a symbol that is in a subframe and that is occupied by the first time-frequency resource, and determine resource locations of time-frequency resources available for sending or receiving the SPS data based on the SPS period length, the symbol information, and the SPS activation command; and
a transceiver configured to send the SPS configuration parameter to a terminal device;
wherein the processor is further configured to: when a time-frequency resource available for sending or receiving the SPS data is partially or completely occupied, calculate an offset time-frequency resource based on the first period offset;
wherein the transceiver is further configured to receive or send the SPS data on the offset time-frequency resource.

7. The network device according to claim 6, wherein to determine the resource locations of the time-frequency resources available for sending or receiving the SPS data, the processor is configured to: determine a resource location of the first time-frequency resource based on the symbol information and the SPS activation command, and determine a resource location of a subsequent time-frequency resource available for sending or receiving the SPS data based on the SPS period length and the resource location of the first time-frequency resource.

8. The network device according to claim 6, wherein the symbol information comprises a start symbol location and a quantity of symbols, or comprises short-subframe quantity information and a short-subframe number, wherein the short-subframe quantity information is used to indicate a quantity of short subframes in each subframe.

9. The network device according to claim 6, wherein the transceiver is further configured to: when the time-frequency resource available for sending or receiving the SPS data is partially occupied, send or receive the SPS data on an unoccupied time-frequency resource available for sending or receiving the SPS data.

10. The network device according to claim 6,
wherein the SPS configuration parameter further comprises SPS priority information; and
the processor is further configured to: when the time-frequency resource available for sending or receiving the SPS data partially or completely overlaps another SPS time-frequency resource, determine a behavior of sending or receiving the SPS data based on the SPS priority information.

11. A terminal device, comprising:
a transceiver configured to receive a semi-persistent scheduling (SPS) configuration parameter sent by a network device, wherein the SPS configuration parameter comprises an SPS period length, symbol information, an SPS activation command, and a first period offset, wherein the SPS activation command is used to indicate a system frame number and a subframe number of a first time-frequency resource available for sending or receiving SPS data, and the symbol information is used to indicate a location of a symbol that is in a subframe and that is occupied by the first time-frequency resource; and
a processor configured to determine resource locations of time-frequency resources available for sending or receiving the SPS data based on the SPS period length, the symbol information, and the SPS activation command;
the processor is further configured to: when a time-frequency resource available for sending or receiving the SPS data is partially or completely occupied, calculate an offset time-frequency resource based on the first period offset; and
the transceiver is further configured to receive or send the SPS data on the offset time-frequency resource.

12. The terminal device according to claim 11, wherein to determine the resource locations of the time-frequency resources available for sending or receiving the SPS data, the processor is configured to: determine a resource location of the first time-frequency resource based on the symbol information and the SPS activation command; and determine a resource location of a subsequent time-frequency resource available for sending or receiving the SPS data based on the SPS period length and the resource location of the first time-frequency resource.

13. The terminal device according to claim 11, wherein the symbol information comprises a start symbol location and a quantity of symbols, or comprises short-subframe quantity information and a short-subframe number, wherein the short-subframe quantity information is used to indicate a quantity of short subframes in each subframe.

14. The terminal device according to claim 11, wherein the transceiver is further configured to send or receive the SPS data on the time-frequency resource available for sending or receiving the SPS data.

15. The terminal device according to claim 14, wherein the transceiver is further configured to: when the time-frequency resource available for sending or receiving the SPS data is partially occupied, send or receive the SPS data on an unoccupied time-frequency resource available for sending or receiving the SPS data.

16. The terminal device according to claim 11, wherein
the SPS configuration parameter further comprises SPS priority information, and
the processor is further configured to: when the time-frequency resource available for sending or receiving the SPS data partially or completely overlaps another SPS time-frequency resource, determine a behavior of sending or receiving the SPS data based on the SPS priority information.

\* \* \* \* \*